United States Patent Office 3,336,377
Patented Aug. 15, 1967

---

3,336,377
PREPARATION OF DICARBOXYLIC ACID CHLORIDES OF ORTHO- AND META-CARBORANYL ETHERS
Alphonso Marcellis, Lake Intervale, and John E. Paustian, Whippany, N.J., assignors to Thiokol Chemical Corporation, Bristol, Pa., a corporation of Delaware
No Drawing. Filed Nov. 18, 1964, Ser. No. 412,223
5 Claims. (Cl. 260—544)

This invention concerns a novel process for the halogenation of boron containing ethers.

More particularly, this invention relates to a process for the preparation of the acid halides of carborane ethers. The halogenated products of this invention are valuable among other things as propellant fuels, dielectric materials and as intermediates for the preparation of thermally stable high polymers.

Carborane (which is abbreviated "A") is the generic term used to describe all the isomers of dicarbaclovododecaborane of the empirical formula: $B_{10}C_2H_{12}$.

The term "carboranyl" is the name given to the radical of the ortho carborane isomer shown below:

$$-C\underset{B_{10}H_{10}}{\overset{\diagup O \diagdown}{\text{———}}}C-$$

The ortho isomer is also referred to by the Greek letter Theta, abbreviated as Θ.
to herein as paracarboranyl and is abbreviated as

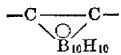

The radical of the meta isomer of carborane is referred to as "neocarboranyl," abbreviated as ⊕.

Recently the preparation of compositions of the formula:

$$\underset{\text{Cl}}{\overset{\text{O}}{\underset{\|}{\text{C}}}}-\Theta-(CH_2)_nO(CH_2)_n\Theta-\underset{\|}{\overset{\text{O}}{\text{C}}}-\text{Cl}$$

wherein $n$ is an integer, was disclosed in S.N. 296,892 filed in the name of Grafstein et al. in the United States Patent Office, on July 19, 1963.

These "diacid chloride carborane ethers" were prepared by two different processes, one utilizing the diacid of the carborane ethers as a starting material, the other using the lithium salt of the above "diacid" as the reactant. The steps leading to the preparation of the "diacid chloride" products described in the aforementioned application appear below:

1. $(H\Theta CH_2)_2O + 2C_4H_9Li \xrightarrow{(C_2H_5)_2O} (Li\Theta CH_2)_2O + 2C_4H_{10}$ 2. $(Li\Theta CH_2)_2O + CO_2 \longrightarrow (LiOOC\Theta CH_2)_2O$ 3. $(LiOOC\Theta CH_2)_2O + (ClOC)_2 \longrightarrow$
   $(ClOC\Theta CH_2)_2O + (LiOOC)_2$
and 4. $(LiOOC\Theta CH_2)_2O + 2HCl \longrightarrow (HOOC\Theta CH_2)_2O + LiCl$ 5. $(HOOC\Theta CH_2)_2O + 2PCl_5 \xrightarrow{POCl_3}$
   $(ClOC\Theta CH_2)_2O + 2POCl_3 + 2HC$ The above two processes have several substantial disadvantages including two or more process steps, poor yields and the use of corrosive starting materials.

For example, the "lithium salt" process (steps 1 to 3) requires two additional steps to go from the dilithium intermediate to the product and yields are less than 50% of theory. Similarly, the "free acid" process (steps 4 and 5) requires the preparation of the same dilithium intermediate, then an additional three steps to proceed from the intermediate to the diacid chloride product. Not only are yields poor (less than 50% of theory) but the phosphorus pentachloride reactant is extremely corrosive to metal components of standard process equipment used in scale-up.

As the above discussion of the prior art indicates, there is a need for an improved preparative process for preparing the diacid chlorides of carborane ethers. A process which would require less process steps with a concurrent gain in yield would be an advance in the art.

Thus, it is an object of this invention among others to prepare diacid chlorides of carborane ethers by a one step process.

It is an additional object of this invention to prepare the above compositions in substantially higher yields than has been possible previously.

An additional object of this invention is the preparation of the above products without using corrosive reactants.

Other objects will become more apparent after a further reading of this application.

These objects are achieved by the process described more fully below.

In practice, phosgene is contacted with a dialkali metal derivative of a carborane ether until each alkali metal is replaced with an acyl chloride

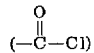

group and 2 moles of alkali metal chloride by-products are produced. The reaction route is shown below:

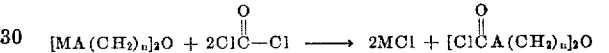

wherein M is an alkali metal preferably lithium, $n$ is an integer including 0, preferably ranging from 1 up to and including 6, and A is the generic term for all of the isomers of the carborane radical such as ortho, para, and meta.

The inventive process is advantageous in several respects including good yields, the use of non-corrosive reactants, and mild and flexible reaction conditions.

For example, as indicated earlier, yields of over 80% of theory have been obtained using the inventive process. In contrast, neither of the two prior art processes averages above 50% yields. In addition, the novel process of this invention does not require the use of corrosive starting materials as do the prior art processes. For instance, phosphorous pentachloride and phosphorous oxychloride are corrosive to the common metals and alloys such as iron and steel.

Therefore, in any scaling-up work where metallic reactors are used, increased corrosion could be expected. In contrast, phosgene does not cause corrosion problems under the favored reaction conditions.

The flexibility of reaction conditions can be seen in several respects. For instance, while the reaction is preferably run using inert solvents such as the dialkylethers, tetrahyrofuran, hexane, aromatics, etc., since the reactants are used in the form of their reaction mixture, no additional solvents need be added.

Other permissable process variations are as follows:

*Reactants.*—The lithium derivatives of the carborane ethers are favored reactants because of their good reactivity and their ease of preparation. However, the other alkali metal derivatives may be used. These include the corresponding sodium and potassium ether derivatives.

*Temperatures.*—Preferably the reaction is run at temperatures ranging from about —20 to +10° C. This temperature range is preferred because phosgene is in the liquid state and can be readily handled. However, higher temperatures can be used, up to about 100° C. or higher where a pressurized vessel, reactor or bomb is used.

*Pressure.*—Ordinarily near atmospheric pressures are used. At higher temperatures, super atmospheric pressures are required to maintain phosgene in the liquid state.

*Reaction time.*—The reaction is ordinarily complete within ¼ to 4 hours after the addition of the two reactants. However, since the reaction time is dependent upon variables such as the carborane reactant and the temperature and/or pressure employed, greater or lesser times are possible.

*Ratio of reactants.*—Preferably a large excess over the stoichiometric ratio of 2 moles of phosgene to 1 of carborane reactant is used. However, this ratio can be reduced (but not below a 2:1 ratio) or exceeded by as much as 50% or more without effecting operability.

The preparation of the lithium derivatives of carborane ethers and the chemistry of these ethers is described in "Inorg. Chem.," 2, 1125 (December 1963) by Grafstein et al. An illustrative preparation is as follows:

In a suitable reaction vessel equipped with heating, cooling, stirring and distillation means are placed .099 mole of butyl lithium in 150 ml. of diethyl ether. To the stirred and chilled solution is slowly added 0.045 mole of bis-(1-carboranylmethyl) ether dissolved in 300 ml. of diethyl ether. The reaction mixture is allowed to rise to about 35° C. and is stirred for about 3.5 hours. The dilithium reactant thus formed is used in the form of the reaction mixture.

The corresponding dilithium derivatives of neocarborane such as $(CH_2 \oplus Li)_2O$ can be prepared by reacting an alkyl lithium with the composition $(CH_2 \oplus Li)_2O$. The other alkali derivatives are formed in the same way except that alkyl sodium or potassium are used instead of the alkyl lithium.

The following embodiments are illustrative of the inventive reaction. To an aliquot containing 0.0151 mole of the above described dilithiated reactant is added 0.182 mole of liquified phosgene at −5° C. over a 0.3 hour period. After the addition is complete, the reaction mixture is stirred for an additional hour at 0–25° C. The ethyl ether and excess phosgene are distilled off and the remaining residue is extracted with n-pentane. The pentane is evaporated to dryness producing a material which infrared analysis found to be

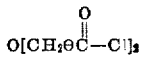

In a related embodiment the same product described above,

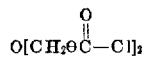

is prepared as follows:

The dipotassium derivative of $(H\theta CH_2)_2O$ is prepared by adding 0.1 mole of $(H\theta CH_2)_2O$ in diethyl ether to a 0.2 mole of butyl potassium in excess pentane at 0° C. The mixture is stirred for 4 hours during which time the temperature is allowed to rise to about 30° C.

The reaction mixture of the dipotassium carborane ether derivative is added to 1.0 mole of liquified phosgene at −10° C. over an 0.5 hour time period. After the addition is complete, the reaction mixture is stirred for 2 hours and the solvents and phosgene distilled off. The residue is taken up into pentane and evaporated to a solid product.

In a related embodiment, the neocarborane product

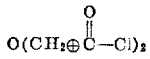

ether is prepared as follows:

The dilithium reactant $O(CH_2 \oplus Li)_2$ is prepared by contacting 0.02 mole of $C_4H_9Li$ in pentane with 0.01 mole of $O(CH_2 \oplus H)_2$ in diethyl ether between 0–5° C. The mixture is stirred for an additional 4 hours and allowed to come to room temperature.

The reaction mixture thus derived is added to 0.18 mole of liquified phosgene at 0° C. for ½ hour period. After the addition is complete, the reaction mixture is allowed to reach room temperature with continued stirring. The diethylether and excess phosgene are distilled off and the solid residue extracted with pentane. The pentane is evaporated off to obtain a dry residue.

As indicated by the embodiments above, numerous changes and modifications in the reaction conditions and reactants can be made without departing from the inventive concept. This invention's meets and bounds are best defined by the claims which follow.

We claim:

1. A process for preparing diacid chloride products of carborane ethers included within the formula:

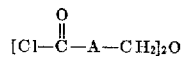

wherein A is selected from the group consisting of the ortho carboranyl radical and the meta carboranyl radical of the empirical formula $B_{10}H_{10}C_2$, comprising contacting at a temperature between about −20° C. and 100° C. an alkali metal reactant of the formula:

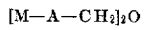

wherein M is an alkali metal and A is as defined above, with phosgene in the ratio of at least 2 moles of phosgene to 1 mole of said alkali metal reactant, until the alkali metal is displaced from said alkali metal reactant and the diacid chloride product of carborane ether is formed, and isolating the product.

2. A process as defined in claim 1 wherein A is the ortho carboranyl radical.

3. A process as defined in claim 1 wherein A is the meta carboranyl radical.

4. A process as defined in claim 1 wherein M is lithium.

5. A process as defined in claim 1 wherein M is potassium.

No references cited.

LORRAINE A. WEINBERGER, *Primary Examiner.*

RICHARD K. JACKSON, *Examiner.*